INVENTOR.
Harold R. Walker
BY Michael S. Striker
ATTORNEY

INVENTOR.
Harold R. Walker
BY Michael S. Striker
ATTORNEY

INVENTOR.
Harold R. Walker
BY Michael S. Striker
ATTORNEY

INVENTOR.
Harold R. Walker
BY Michael S. Striker
ATTORNEY

Nov. 29, 1966 H. R. WALKER 3,288,922

COMMUNICATION SYSTEM

Filed April 3, 1963 6 Sheets-Sheet 5

INVENTOR.
Harold R. Walker
BY Michael S. Striker
ATTORNEY

INVENTOR.
Harold R. Walker
BY Michael S. Striker
ATTORNEY

United States Patent Office 3,288,922
Patented Nov. 29, 1966

3,288,922
COMMUNICATION SYSTEM
Harold R. Walker, Metuchen, N.J., assignor to Teleglobe Pay-TV System, Inc., New York, N.Y.
Filed Apr. 3, 1963, Ser. No. 270,345
10 Claims. (Cl. 178—6)

The present invention relates to a communication system. More particularly, the present invention relates to a subscription communication system of the type wherein a central station is apprised of the receiving conditions of a plurality of subscriber stations insofar as an audio signal is concerned. An audio signal, which may be the subscription program sound of a radio or television or other subscription program or which may be advertising matter, is transmitted over a plurality of telephone type wires to the subscriber stations and the communication system of the present invention provides at a central station an indication of whether or not each subscriber station is receiving the audio signal.

The principal object of the present invention is to provide a new and improved subscription communication system.

An object of the present invention is to provide a subscription communication system for indicating the receiving condition of a subscriber station with reliability and accuracy.

An object of the present invention is to provide a subscription communication system for indicating the receiving condition of each of a plurality of subscriber stations with reliability and accuracy.

In order that the present invention may be readily carried into effect, it will now be described with reference to the accompanying drawings, wherein.

Figure 1:
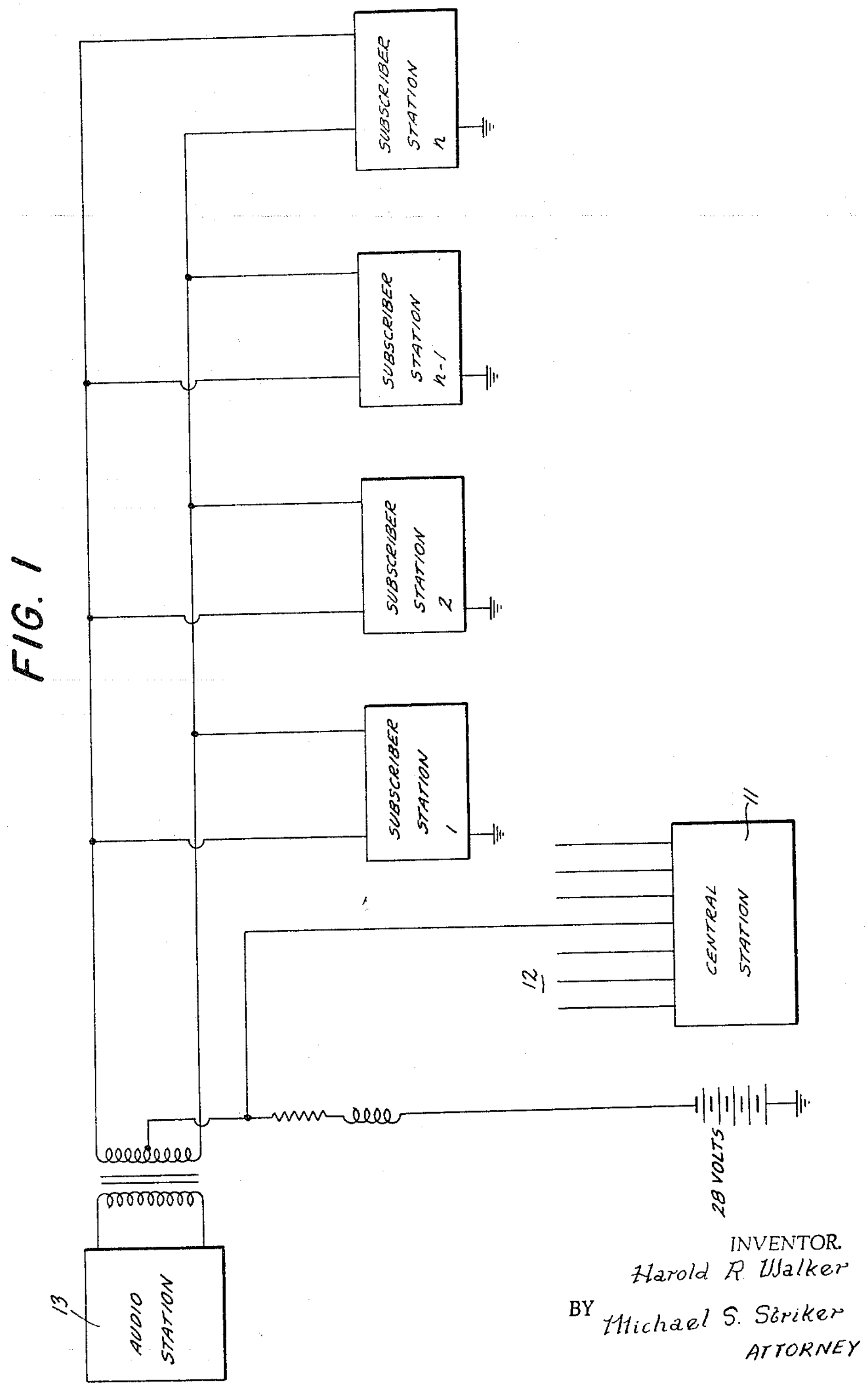
FIG. 1 is a block diagram of an embodiment of the subscription communication system of the present invention.
Figure 6:
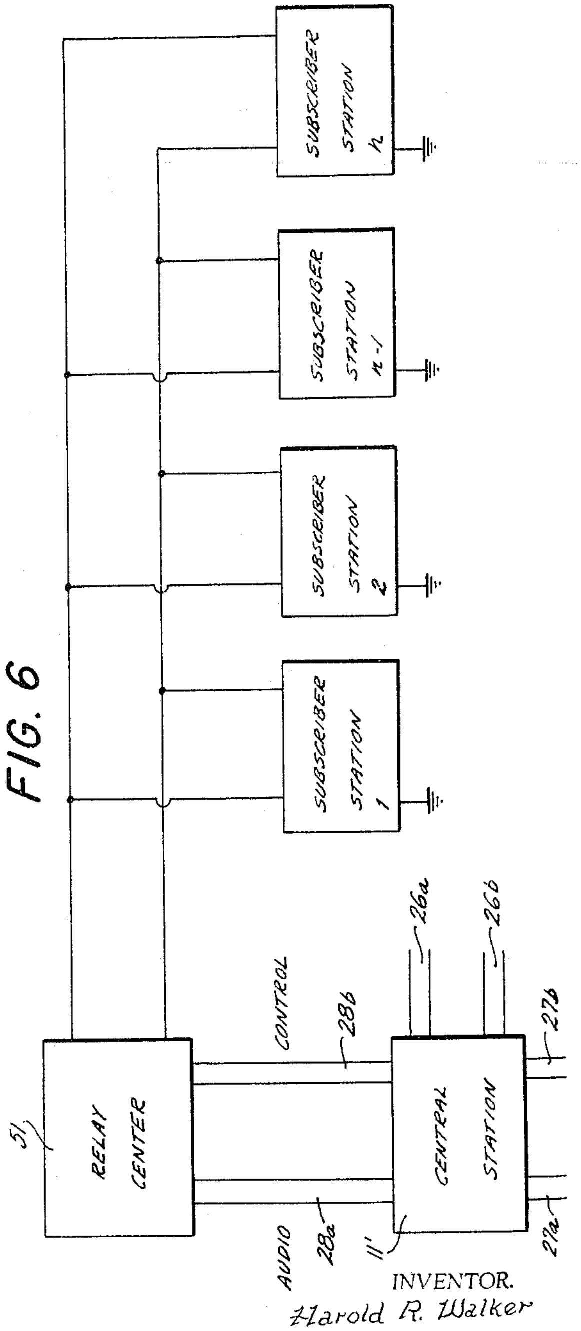
FIG. 6 is a block diagram of a modification of the embodiment of the subscription communication system of FIG. 1.
Figure 7:
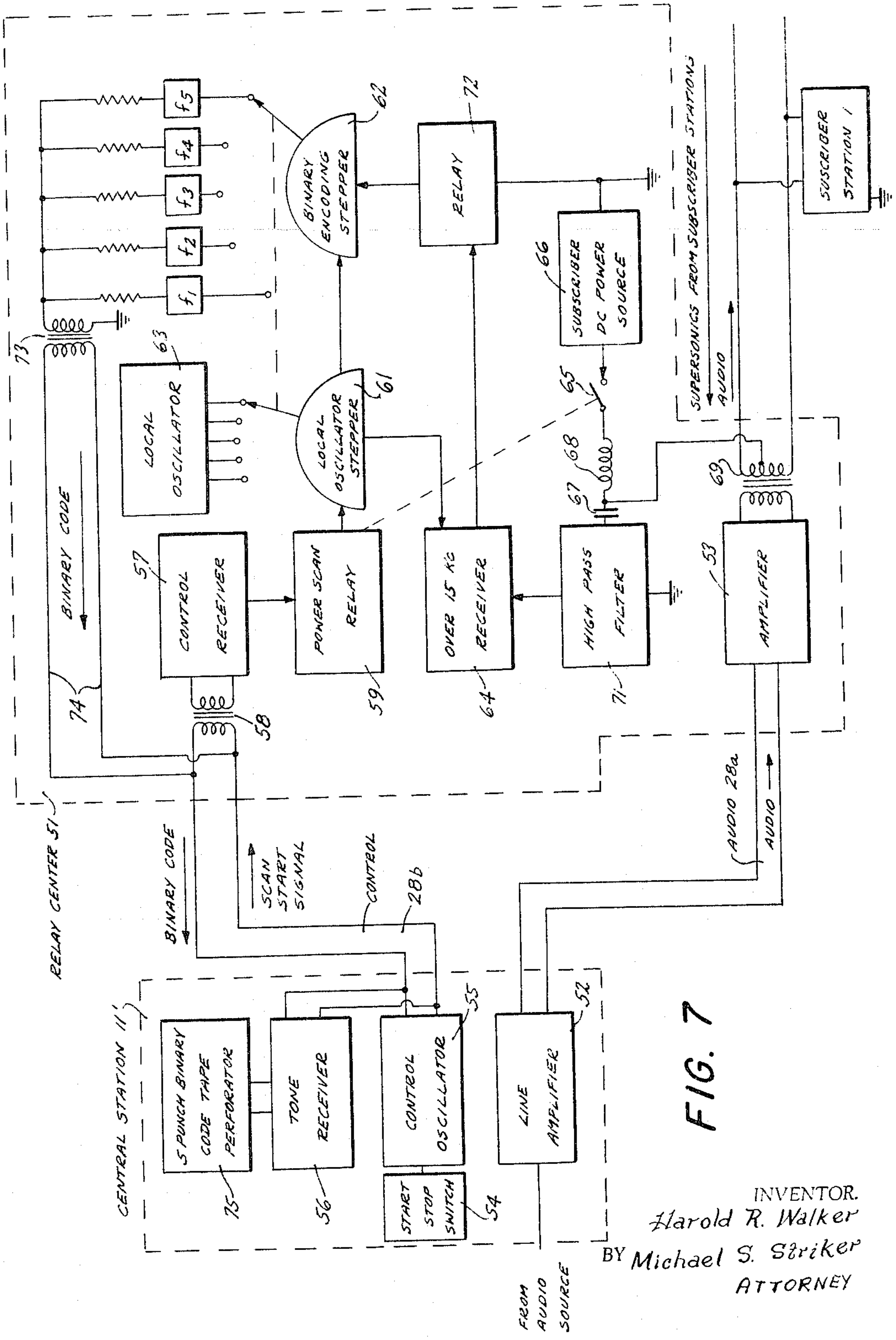
Figure 8:
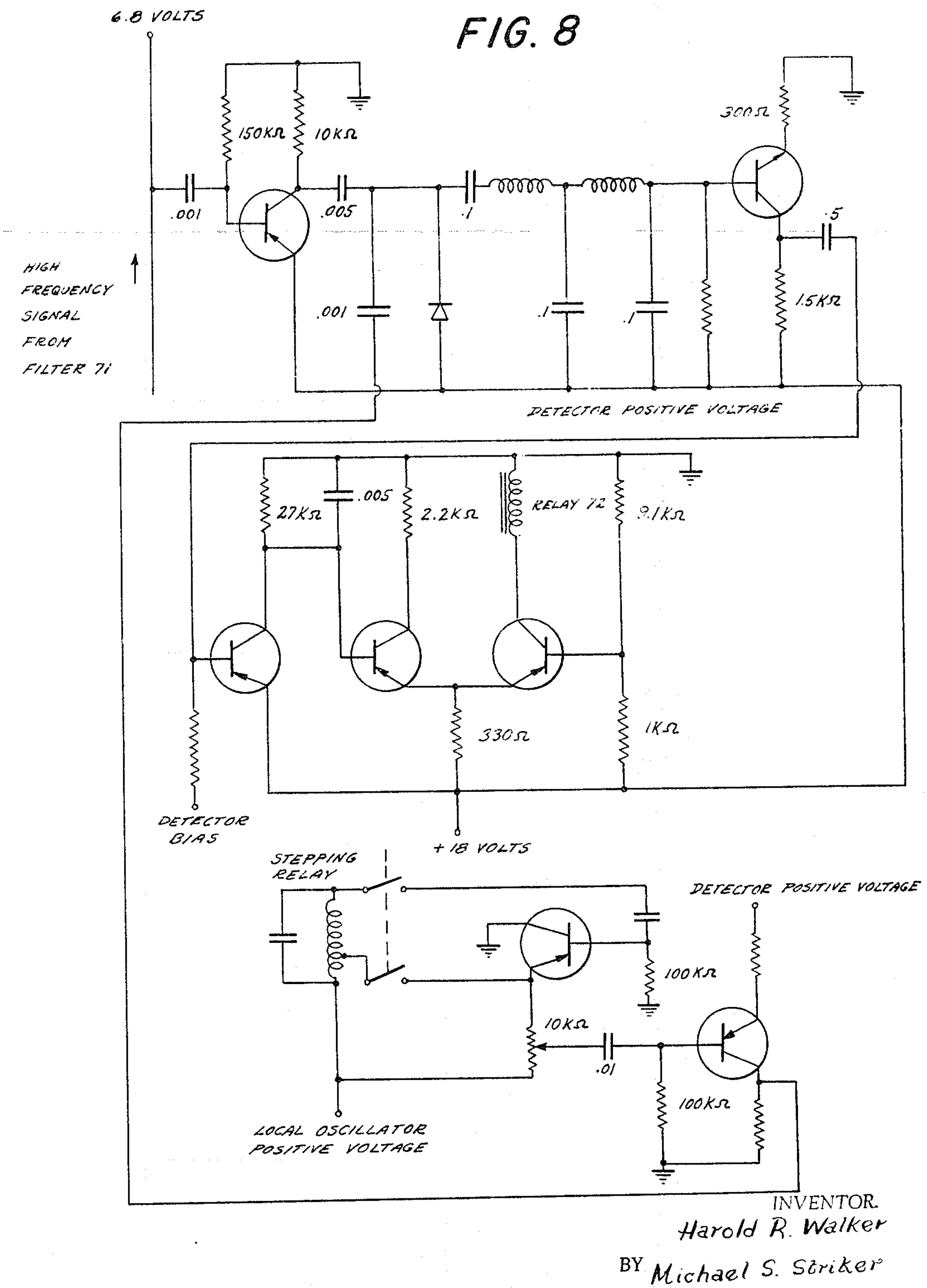

FIG. 7 is a block diagram of an embodiment of a relay center which may be utilized in the arrangement of FIG. 6, and a block diagram of an embodiment of a central station which may be utilized in the arrangement of FIG. 6; and FIG. 8 is a schematic circuit diagram of a superheterodyne circuit which provides another embodiment of the detector portion of the subscriber station of the communication system of FIG. 1 and which may be utilized as the over 15 kc. receiver of the relay center of FIG. 7.

In the figures the same components are identified by the same reference numerals.

In FIG. 1, a central station 11 has a plurality of wires 12 extending therefrom to a plurality of subscriber stations 1, 2, . . . $n-1$, $n$. Each of the wires extending from the central station 11 is a telephone type wire preferably having a plurality of $n$ subscriber stations connected thereto. Thus, for example, 200 telephone lines may extend from the central station 11 and 20 subscriber stations may be connected to each of the 200 lines. A "party" system of this type permits the utilization of the maximum number of subscriber stations with the minimum number of lines.

In FIG. 1, a single party line for a single line extending from the central station 11 is shown; each of the lines 12 extending from said central station being a party line with a plurality of subscriber stations connected thereto. Each of the party lines has a voltage of 28 volts D.C. maintained on it in order to operate equipment at each subscriber station.

An audio station 13 transmits an audio signal to the subscriber stations via the wires 12. The audio station may be located at the central station 11 or it may be located at a distance from said central station. The audio signal may comprise the sound of a subscription radio program, the audio portion of a subscription television program or any other type of subscription program, or advertising material independent of the subscription program or relating to the subscription program directly, The audio signal is transmitted through each party line extending from the central station 11, so that each subscriber station may pick it up.

Figure 2:
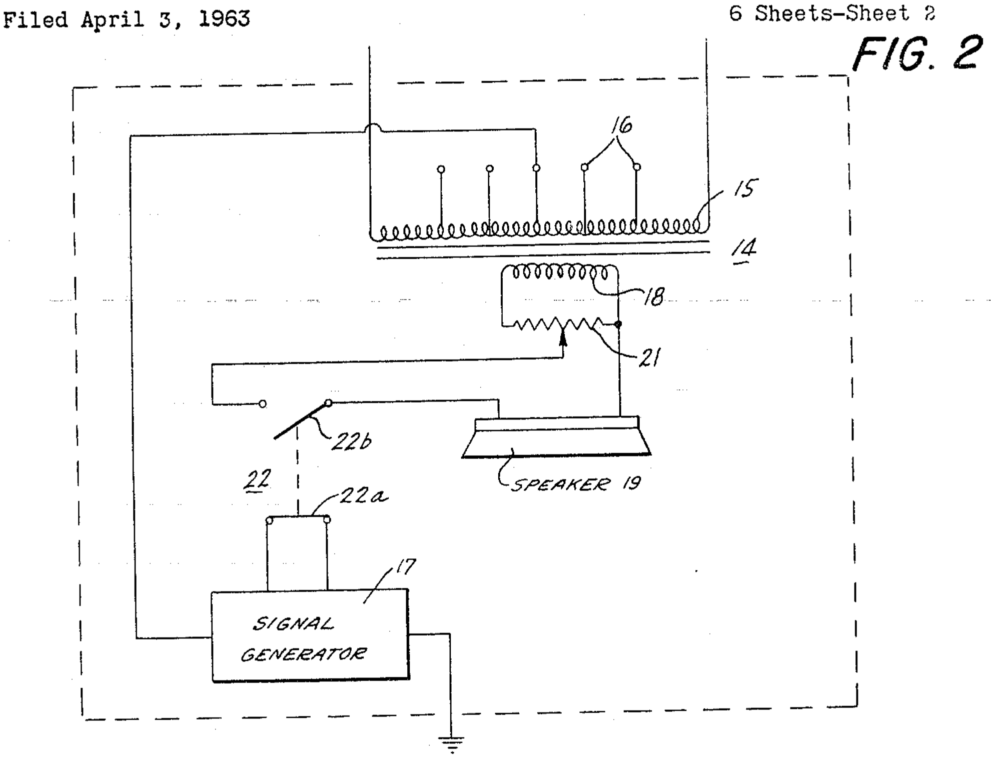
FIG. 2 is a schematic circuit diagram of an embodiment of a subscriber station of the communication system of FIG. 1.

FIG. 2 is a schematic circuit diagram of an embodiment of a subscriber station of the communication system of FIG. 1. The party lines from the central station 11, through which is transmitted the audio signal and on which is the impressed D.C. voltage, terminate in each subscriber station in a transformer 14. The party lines terminate in a tapped primary winding 15 of the transformer 14 having a plurality of taps 16. The taps 16 of the primary winding 15 of the transformer 14 enable a desired audio power level to be derived from the 28 volt line. This power is utilized to operate a signal generator 17.

A secondary winding 18 of the transformer 14 provides operating voltage for a speaker 19. The speaker 19, when connected to the party line, reproduces the audio signal transmitted from the audio station 13 (FIG. 1). The speaker 19 is provided with a volume control 21.

A switch 22 is connected between the volume control 21 and the speaker 19 and in the circuit of the signal generator 17. The switch 22 comprises two switch arms **22*a* and 22*b*. The switch arm 22*a* is pivotally mounted in a line from the volume control 21 to the speaker 19. The switch arm 22*b* is pivotally mounted in the circuit of the signal generator 17. The switch arms 22*a* and 22*b* of the switch 22** are mechanically coupled to each other, so that when either of said switch arms is pivotally moved to open or close the line in which it is connected, the other of said switch arms is pivotally moved by the mechanical linkage between said switch arms to close or open the line in which said other of said switch arms is connected.

When the switch arm **22*b* is pivotally moved up to close the line from the volume control 21 to the speaker 19, the switch arm 22*a* is pivotally moved by the mechanical linkage between them to open the line in the circuit of the signal generator 17**.

The signal generator 17 may comprise any suitable signal generating arrangement known in the art. During the time that the subscriber does not wish to receive the subscription audio signal from the audio station 13 (FIG. 1), the switch 22 is in its first position, shown in FIG. 2, in which the circuit of the signal generator 17 is closed through the switch arm **22*a* and said signal generator is connected to the party line and the speaker 19 is disconnected from the party line due to the opening of the line from the transformer secondary 18 to the speaker 19 by the switch arm 22*b***.

In the first position of the switch 22, the signal generator 17 is operated by the party line voltage and produces an identification signal which is transmitted to the central station 11 (FIG. 1) via the party line. The signal generator 17 is preferably operated by an interrogation signal from the central station 11. The identification signal produced by the signal generator 17 has a predetermined frequency which is different for each subscriber station on the party line. The identification signals for the *n* subscriber stations on a party line are all different, therefore, and are in the frequency range of from 15 to 100 kilocycles per second. Thus, as long as a subscriber does not receive the subscription audio signal, the central station 11 (FIG. 1) receives an identification signal from the subscriber station of that subscriber. The central station is thus constantly aware of those subscribers who need not be billed for a subscription program.

As long as the signal generator 17 is operated and producers its identification signal, the speaker 19 is inoperative and does not reproduce the audio signal transmitted from the audio station 13 (FIG. 1). This is due to the fact that the switch 22 does not permit both the signal generator 17 and the speaker 19 to be operative at the same time. As hereinbefore described, the switch 22 permits only one of the signal generator 17 and the speaker 19 to be operative at a time; as long as one of these components is operative, the switch keeps the other of these components inoperative.

When the subscriber wishes to receive the subscription audio signal from the audio station 13 (FIG. 1), he moves the switch 22 to its second position. In the second position of the switch 22, the speaker 19 is operated by the party line voltage and reproduces the audio signal from the audio station 13 (FIG. 1). As long as the speaker 19 is operated and reproduces the audio signal, the signal generator is inoperative and does not produce its identification signal. This is due to the fact that in its second position, the switch 22 maintains the speaker 19 in operative condition and maintains the signal generator 17 in inoperative condition.

Thus, as long as the subscriber receives the subscription audio signal, the central station does not receive an identification signal from the subscriber station of that subscriber. The central station is thus constantly aware of those subscribers who need to be billed for a subscription program. Any tinkering with his equipment by the subscriber will open the line to the signal generator 17 and thus apprise the central station 11 (FIG. 1) of the fact that the subscriber should be billed.

Any suitable signal generating circuit arrangement may be utilized as the signal generator 17. Thus, for example, an oscillator circuit which producers a signal having a predetermined frequency may be utilized as the signal generator 17. Each signal generator on the party line must produce a signal having a frequency different from the frequencies of the signals produced by the other signal generators on the party line. A suitable signal generator may comprise, for example, a transistor oscillator circuit arrangement of the type shown in FIG. 3.

Figure 3:
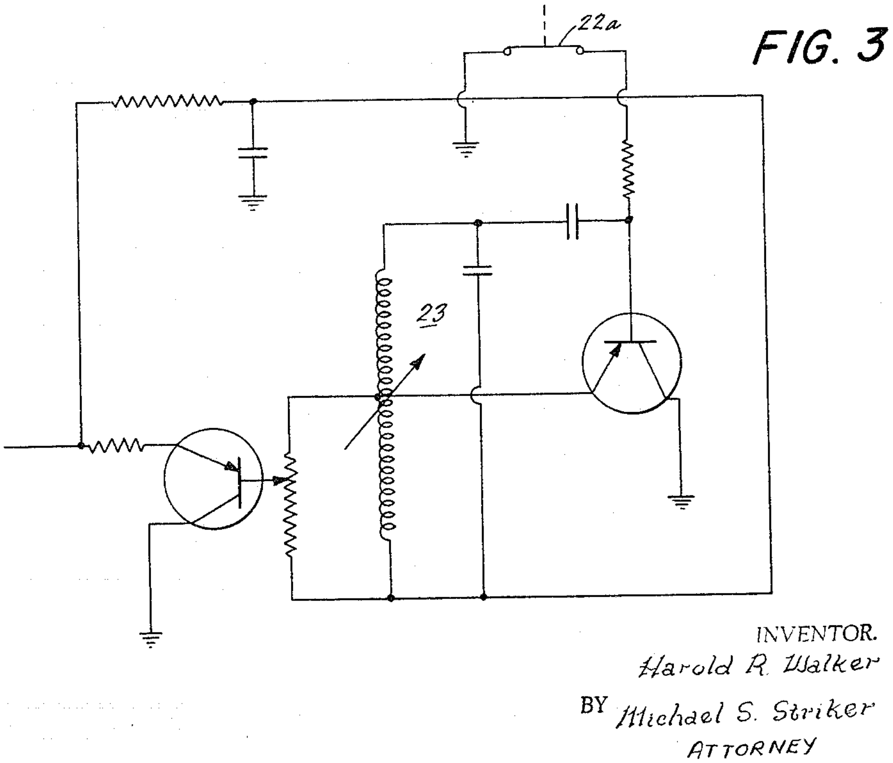
FIG. 3 is a schematic circuit diagram of a signal generator of a subscriber station of the communication system of FIG. 1.

In the signal generator circuit arrangement of FIG. 3, the frequency of the signal produced is determined by the tank circuit 23 which may be adjusted so that the signal generator at each subscriber station produces its own identifying signal.

The signal generator circuit arrangement of FIG. 3 has a substantially constant A.C. impedance to the telephone line circuit whether it is operative or inoperative. The substantially constant A.C. impedance is necessary in order to keep the signal voltage at the central station within predetermined amplitude limits although subscribers go on and off the line.

Figure 4:
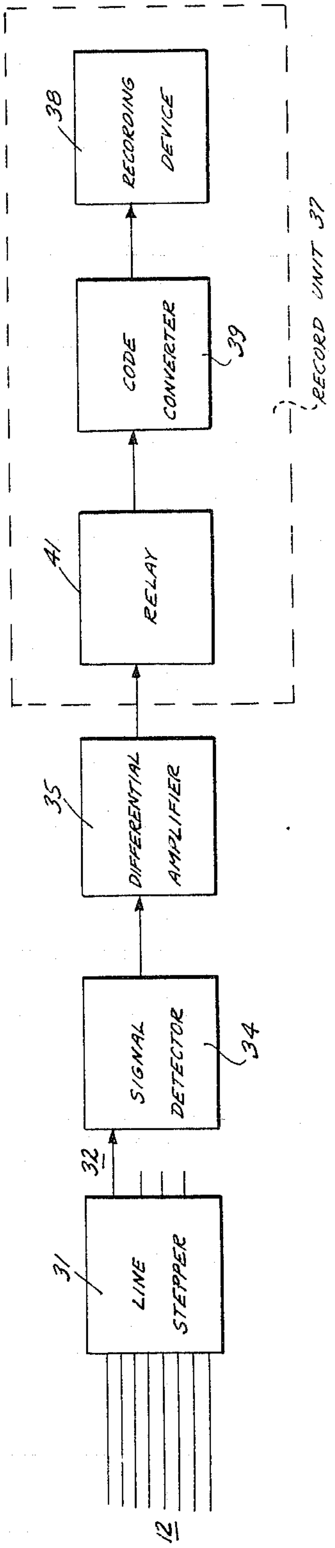
FIG. 4 is a block diagram of an embodiment of the central station of the communication system of FIG. 1.
Figure 5:
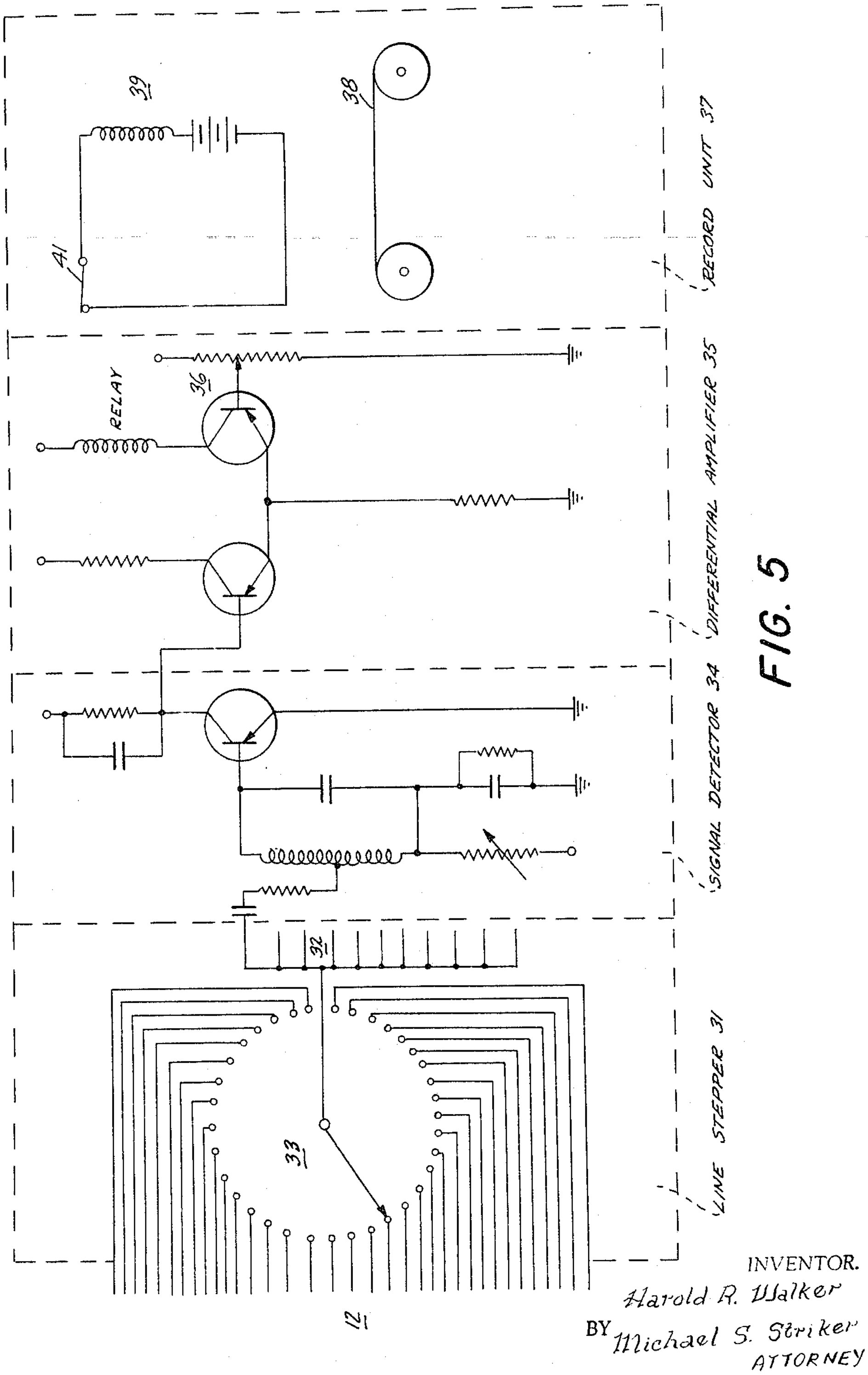
FIG. 5 is a schematic circuit diagram of the central station embodiment of FIG. 4.

FIG. 4 is a block diagram of an embodiment of the central station 11 (FIG. 1) and FIG. 5 is a schematic circuit diagram of the embodiment of FIG. 4. In FIGS. 4 and 5, each of the party lines is connected to the central station through its line 12. The lines 12 are connected to a line stepper 31 which comprises any suitable means for connecting each of the lines 12 to a number of lines equal in number to the number of subscriber stations on each party line. Thus, for example, if there are 200 lines with 20 subscriber stations on each line, there are 200 lines 12 connected to the line stepper 31. The line stepper then selectively connects each of the 200 lines to 20 output lines 32.

The line stepper may comprise a suitable rotary stepper 33 of known type which connects each of the lines 12 in sequence to the output lines 32. A signal detector 34 is connected to each of the output lines 32 of the line stepper 31. Each of the output lines 32 corresponds to a different one of the subscriber stations connected to a party line. Each of the signal detectors 34 is tuned to the identification signal frequency of its corresponding subscriber station.

A differential amplifier 35 is connected to each signal detector 34. The signal detector and differential amplifier circuitry is known in the art and functions in a known manner to respond to a signal of a frequency to which the signal detector is tuned by means of its tank circuit 36. The differential amplifier responds to a change in the condition of the signal detector. That is, the signal detector may maintain the balance of the differential amplifier as long as an identification signal is received by said signal detector and the differential amplifier may be unbalanced by the failure of the signal detector to receive an identification signal.

As long as an identification signal is received from a subscriber station, therefore, the signal detector and differential amplifier combination 34, 35 corresponding to such subscriber station remains quiescent. As soon as, and as long as, there is no identification signal from the subscriber station, the signal detector and differential amplifier combination 34, 35 produces a signal. Thus, each of the signal detector and differential amplifier combinations 34, 35 indicates, by the production of a signal, that the switch 22 of its corresponding subscriber station is in its second position, and thereby indicates that said corresponding subscriber station is reproducing the subscription audio signal from the audio station 13 (FIG. 1).

Each differential amplifier 35 is provided with a threshold control 36 which functions to adjust its sensitivity. Each signal detector 34 may comprise a known transistor circuit arrangement as shown in FIG. 5 and each differential amplifier 35 may comprise a known transistor circuit arrangement as shown in FIG. 5.

A record unit 37 is connected to each differential amplifier 35. The record unit 37 may comprise any suitable arrangement for recording the time that an identification signal is not received from the corresponding subscriber station. Each subscriber station is identified on a record medium 38 by a suitable device such as a code converter 39. The record medium 38 may comprise any suitable device such as, for example, a magnetic tape, drum, card or a tape adapted to be perforated. The code converter 39 may comprise any suitable arrangement such as, for example, a magnetic or mechanical device for marking the tape 38 magnetically or mechanically with a code representation of the corresponding subscriber station whenever the differential amplifier of that output line produces a signal, thereby indicating that the corresponding subscriber station is receiving and reproducing the subscription audio signal.

A relay 41 may be connected to each differential amplifier 35 to actuate the corresponding code converter 39 and recording device 38 when the differential amplifier produces a signal. Each differential amplifier 35 and its corresponding relay 41 together constitute an actuator which functions to actuate the record unit 37 whenever and as long as the signal detector 34 to which the differential amplifier is connected fails to receive an identification signal from the corresponding subscriber station.

The record medium or recording device 38 may comprise a tape adapted to be mechanically perforated and the code converter 39 may comprise a tape perforator, which includes a plurality of perforating pins each actuated to pierce or perforate the tape upon energization of a solenoid in which it is slidably supported in proximity to the tape, in known manner. Each of the output lines' code converter may be set to perforate in its own identifying binary code, so that the tape 38 may be perforated in any combination of five perforations, each representing a different one of the subscriber stations.

As soon as the subscriber station fails to transmit its identification signal, thereby indicating that it is reproducing the subscription audio signal, the corresponding differential amplifier 35 at the central station produces a signal which closes the corresponding relay 41 to actuate the recording arrangement 37 to record the fact that said subscriber station is reproducing the subscription audio signal. The record is maintained in such fashion and therefore indicates the time period that the corresponding subscriber station, identified by its code combination on the record medium, has reproduced, and must therefore be billed for, the subscription audio signal from the audio station 13 (FIG. 1).

The record media utilized may be readily marked with time by any known method, so that a complete foolproof record of subscription service is available. Of course, a single record medium or tape may service all the subscriber stations on a single party line if each described circuit arrangement is connected to a code converter in its own code combination so that as soon as it is actuated the tape is marked with the particular code combination, and so on, for each subscriber station servicing circuit in the central station.

FIG. 6 is a modification of the embodiment of FIG. 1. The arrangement of FIG. 6 enables a single central office scanning system to distribute audio and remotely telemeter the receiving condition of a speaker control unit or a video or combined video-audio decoder arrangement.

The arrangement of FIG. 6 extends the range of operation of the embodiment of FIG. 1 because the range of operation of the embodiment of FIG. 1 is limited due to telephone line frequency limitations. The range of operation of the embodiment of FIG. 1 is thus approximately ¾ of a mile. The arrangement of FIG. 6 functions as a relay system which boosts the power at each relay station so that the range of operation is unlimited by virtue of the frequency conversion of the datalog transmission.

Two pairs of wires are required to connect the central station 11' to each relay center such as, for example, relay center 51. The central station 11' may be connected to a plurality of relay centers, as indicated by wire pairs 26*a*, 26*b*, and 27*a*, 27*b*, for example. Each of the relay centers may be connected to a plurality of subscriber lines, only one of which is shown in FIG. 6.

The central station 11' is connected to the relay center 51 by wire pairs 28*a* and 28*b*. The wire pair 28*a* conducts the audio signal from the central station 11' for redistribution. The audio signal may, as described with reference to FIG. 1, be transmitted from a separate audio station (not shown in FIG. 6). The wire pair 28*b* conducts a triggering signal from the central station 11' to the relay center 51 to trigger said relay center to check the receiving conditions of subscriber stations by converting an interrogating signal to a suitably usable frequency.

The interrogating signal is transmitted to each interrogated subscriber station. The signal generator 17 (FIG. 2) at each subscriber station is controlled by the interrogation signal from the central station 11 (FIG. 1) or the central station 11' via the relay center 51 (FIG. 6).

The wire pair 28*b* also serves to conduct a group of tones, comprising a binary code which indicates the operating condition of each of the interrogated subscribers, from the subscriber stations to the central station 11' via the relay center 51. These tones are at frequencies of less than 3500 cycles per second.

The relay center 51 eliminates the need for connecting a second pair of wires to each subscriber station, since it permits the transmission of the interrogating signal and the audio signals in the same line. The relay center 51 includes all the central station circuitry and equipment and remote control circuitry which comprises known circuitry including frequency compensating audio booster amplifiers, interrogating transmitters, frequency conversion circuitry, scanning circuitry, stepping circuitry and combining networks which provide the frequency crossover between the audio signals and the interrogating signal. The relay center 51 serves, in effect, as a remote controlled central station, so that it includes substantially the same circuitry as the central station and functions in substantially the same manner as the central station, with the addition of the frequency conversion and interrogation signal transmission equipment.

FIG. 7 is a block diagram of an embodiment of a relay center which may be utilized in the arrangement of FIG. 6, and a block diagram of an embodiment of a central station which may be utilized in the arrangement of FIG. 6. In the embodiment of FIG. 7 an audio signal, which may be received from an audio station or which may be originated at the central station, is transmitted to the subscriber stations via a line amplifier 52 at the central station 11' and an amplifier 53 at the relay center 51. The audio signal is transmitted at a controlled level with proper frequency pre-emphasis.

A start-stop switch 54 enegergizes a control oscillator 55 to signal the start of a subscriber scan in the relay center 51. A tone receiver 56 responds to the control oscillator signal and is energized. A control receiver 57 at the remote center 51 receives the signal from the control oscillator 55 through the control lines 28*b* and a transformer 58 and starts the scanning cycle. The control receiver 57 energizes a power scan relay 59 which drives a local oscillator stepper 61 and a binary encoding stepper 62.

The local oscillator stepper 61 feeds the signal of a local oscillator 63 to an over 15 kc. receiver 64. The over 15 kc. receiver 64 comprises a superheterodyne circuit arrangement such as, for example, that shown in FIG. 8. The local oscillator 63 provides the supersonic beat signals for the over 15 kc. superheterodyne receiver circuit 64.

The signal generators 17 of the subscriber stations are powered by the power scan relay 59 which closes contacts 65 to feed the output of a subscriber D.C. power source 66 into the subscriber lines. The D.C. output of the subscriber power source 66 powers the signal generators 17 of the subscriber stations. A capacitor 67 and an inductor 68 serve as circuit isolation components.

A mixing and phantom circuit arrangement 69 combines the audio circuit for audio signals transmitted to the subscriber stations and the supersonic circuit for supersonic signals received from the subscriber stations. The supersonic identification signals received from the signal generators 17 of the subscriber stations are fed through the circuit arrangement 69 to a high pass filter 71. The output of the high pass filter 71 is fed to the superheterodyne receiver circuit 64 which energizes a coding relay 72.

The coding relay 72 energizes the binary code frequency sources $f_1$, $f_2$, $f_3$, $f_4$, $f_5$ and the binary code frequencies are sequentially fed to the control lines 28*b* by the binary encoding stepper 62 via a transformer 73 and lines 74. The binary code frequencies in the control lines 28*b* are fed to the tone receiver 56 of the central station 11'. A suitable binary code frequency source arrangement is described in an article entitled "Multitone Oscillators—New Source of Simultaneous Frequencies, by Roelif Stapelfeldt, appearing in Electronics, January 4, 1963, published by McGraw-Hill Publishing Co., Inc. of New York, New York.

The tone receiver 56 of the central station responds to the binary encoded tones received from the relay cented and energizes a five punch binary code tape perforator 75 for ON or OFF perforations. The tape perforator 75 indicates the ON or OFF condition of the subscriber stations in binary code perforations which identify the subscriber stations.

FIG. 8 is a superheterodyne circuit which provides another embodiment of the detector portion of the subscriber station of the communication system of FIG. 1 and which may be utilized as the over 15 kc. receiver of the relay center of FIG. 7.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A pay TV system for determining the operation condition of each of a plurality of subscriber stations comprising, in combination, a central station;

a plurality of subscriber stations;

wire means extending from said central station to each of said subscribed stations;

audio means for transmitting an audio signal to said subscriber stations via said wire means;

signal generating means connected to said wire means at each subscriber station producing an identification signal of a predetermined frequency different from the frequencies of the signal generating means at the other subscriber stations;

transducer means at each subscriber station for reproducing an audio signal;

switch means at each subscriber station movable between a first position in which said switch means makes the signal generating means at said subscriber station operative and opens a circuit from said wire means to the transducer means at said subscriber station and a second position in which said switch means makes said signal generating means inoperative and closes a circuit from said wire means to said transducer means so that in the first position of said switch means an identification signal is transmitted from said signal generating means via said wire means to said central station and an audio signal in said wire means is not reproduced by said transducer means and in the second position of said switch means an identification signal is not transmitted from said signal generating means to said central station and an audio signal in said wire means is reproduced by said transducer means; and indicating means at said central station connected to said wire means for indicating the position of the switch at each subscriber station thereby indicating that the associated transducer means is connected to said wire means.

2. A pay TV system for determining the operation condition of each of a plurality of subscribers stations comprising, in combination, a central station;

a plurality of subscriber stations;

wire means extending from said central station to each of said subscriber stations;

audio means for transmitting an audio signal to said subscriber stations via said wire means;

signal genererating means connected to said wire means at each subscriber station producing an identification signal of a predetermined frequency different from the frequencies of the signal generating means at the other subscriber stations;

transducer means at each subscriber station for reproducing an audio signal;

switch means at each subscriber station movable between a first position in which said switch means makes the signal generating means at said subscriber station operative and opens a circuit from said wire means to the transducer means at said subscriber station and a second position in which said switch means makes said signal generating means inoperative and closes a circuit from said wire means to said transducer means so that in the first position of said switch means an identification signal is transmitted from said signal generating means via said wire means to said central station and an audio signal in said wire means is not reproduced by said transducer means and in the second position of said switch means an identification signal is not transmitted from said signal generating means to said central station and an audio signal in said wire means is reproduced by said transducer means; and indicating means at said central station connected to said wire means for indicating the position of the switch at each subscriber station, said indicating mean comprising recording means for recording the indicated position of the switch at each subscriber station, said indicating means having means inoperative during the presence of an identification signal thereby indicating that the associated transducer means is connected to said wire means.

3. A pay TV system for determining the operation condition of each of a plurality of subscriber stations comprising, in combination, a central station;

a plurality of subscriber stations;

wire means extending from said central station to each of said subscriber stations;

audio means for transmitting an audio signal to said subscriber stations via said wire means;

signal generating means connected to said wire means at each subscriber station producing an identification signal of a predetermined frequency different from the frequencies of the signal generating means at the other subscriber stations;

transducer means at each subscriber station for reproducing an audio signal;

switch means at each subscriber station movable between a first position in which said switch means makes the signal generating means at said subscriber station operative and opens a circuit from said wire means to the transducer means at said subscriber station and a second position in which said switch means makes said signal generating means inoperative and closes a circuit from said wire means to said transducer means so that in the first position of said switch means an identification signal is transmitted from said signal generating means via said wire means to said central station and an audio signal in said wire means is not reproduced by said transducer means and in the second position of said switch means an identification signal is not transmitted from said signal generating means to said central station and an audio signal in said wire means is reproduced by said transducer means; and indicating means at said central station connected to said wire means for indicating the position of the switch at each subscriber station, said indicating means comprising line selecting means connected to said wire means for selectively connecting each of said wire means to a plurality of output lines, said indicating means having means inoperative during the presence of an identification signal thereby indicating that the associated transducer means is connected to said wire means.

4. A pay TV system for determining the operation condition of each of a plurality of subscriber stations comprising, in combination, a central station;

a plurality of subscriber stations;

wire means extending from said central station to each of said subscriber stations;

audio means for transmitting an audio signal to said subscriber stations via said wire means;

signal generating means connected to said wire means at each subscriber station producing an identification signal of a predetermined frequency different from the frequencies of the signal generating means at the other subscriber stations;

transducer means at each subscriber station for reproducing an audio signal;

switch means at each subscriber station movable between a first position in which said switch means makes the signal generating means at said subscriber station operative and opens a circuit from said wire means to the transducer means at said subscriber station and a second position in which said switch means makes said signal generating means inoperative and closes a circuit from said wire means to said transducer means so that in the first position of said switch means an identification signal is transmitted from said signal generating means via said wire means to said central station and an audio signal in said wire means is not reproduced by said transducer means and in the second position of said switch means an identification signal is not transmitted from said signal generating means to said central station and an audio signal in said wire means is reproduced by said transducer means; and indicating means at said central station connected to said wire means for indicating the position of the switch at each subscriber station, said indicating means comprising line selecting means connected to said wire means for selectively connecting each of said wire means to a plurality of output lines and signal detecting means connecting to each of the output lines of said line selecting means, each of said signal detecting means responding to an identification signal having a frequency different from the frequencies of the other identification signals, said indicating means having means inoperative during the presence of an identification signal thereby indicating that the associated transducer means is connected to said wire means.

5. A pay TV system for determining the operation condition of each of a plurality of subscriber stations comprising, in combination, a central station;

a plurality of subscriber station;

wire means extending from said central station to each of said subscriber stations;

audio means for transmitting an audio signal to said subscriber stations via said wire means;

signal generating means connected to said wire means at each subscriber station producing an identification signal of a predetermined frequency different from the frequencies of the signal generating means at the other subscriber stations;

transducer means at each subscriber station for reproducing an audio signal;

switch means at each subscriber station movable between a first position in which said switch means makes the signal generating means at said subscriber station operative and opens a circuit from said wire means to the transducer means at said subscriber station and a second position in which said switch means makes said signal generating means inoperative and closes a circuit from said wire means to said transducer means so that in the first position of said switch means an identification signal is transmitted from said signal generating means via said wire means to said central station and an audio signal in said wire means is not reproduced by said transducer means and in the second position of said switch means an identification signal is not transmitted from said signal generating means to said central station and an audio signal in said wire means is reproduced by said transducer means; and indicating means at said central station connected to said wire means for indicating the position of the switch at each subscriber station, said indicating means comprising line selecting means connected to said wire means for selectively connecting each of said wire means to a plurality of output lines, signal detecting means connected to each of the output lines of said line selecting means, each of said signal detecting means responding to an identification signal having a frequency different from the frequencies of the other identification signals and recording means connected to each of said signal detecting means for recording non-responsiveness of said signal detecting means thereby indicating that the associated transducer means is connected to said wire means.

6. A pay TV system for determining the operation condition of each of a plurality of subscriber stations comprising, in combination, a central station;

a plurality of subscriber stations;

wire means extending from said central station to each of said subscriber stations;

audio means for transmitting an audio signal to said subscriber stations via said wire means;

signal generating means connected to said wire means at each subscriber station producing an identification signal of a predetermined frequency different from the frequencies of the signal generating means at the other subscriber stations;

transducer means at each subscriber station for reproducing an audio signal;

switch means at each subscriber station movable between a first position in which said switch means makes the signal generating means at said subscriber station operative and opens a circuit from said wire means to the transducer means at said subscriber station and a second position in which said switch means makes said signal generating means inoperative and closes a circuit from said wire means to said transducer means so that in the first position of said switch means an identification signal is transmitted from said signal generating means via said wire means to said central station and an audio signal in said wire means is not reproduced by said transducer means and in the second position of said switch means an identification signal is not transmitted from said signal generating means to said central station and an audio signal in said wire means is reproduced by said transducer means; and indicating means at said central station connected to said wire means for indicating the position of the switch at each subscriber station, said indicating means comprising line selecting means connected to said wire means for selectively connecting each of said wire means to a plurality of output lines, signal detecting means connected to each of the output lines of said line selecting means, each of said signal detecting means responding to an identification signal having a frequency different from the frequencies of the other identification signals and recording means connected to each of said signal detecting means for recording non-responsiveness of said signal detecting means, each of said recording means comprising a record medium and means for imparting to said record medium a predetermined record upon the non-responsiveness of the corresponding signal detecting means thereby indicating that the associated transducer means is connected to said wire means.

7. A pay TV system for determining the operation condition of each of a plurality of subscriber stations comprising, in combination, a central station;

a plurality of subscriber stations;

audio means for transmitting an audio signal to said subscriber stations via said wire means;

signal generation means connected to said wire means at each subscriber station producing an identification signal of a predetermined frequency different from the frequencies of the signal generating means at at the other subscriber stations;

transducer means at each subscriber station for reproducing an audio signal;

switch means at each subscriber station movable between a first position in which said switch means makes the signal generating means at said subscriber station operative and opens a circuit from said wire means to the transducer means at said subscriber station and a second position in which said switch means makes said signal generating means inoperative and closes a circuit from said wire means to said transducer means so that in the first position of said switch means an identification signal is transmitted from said signal generating means via said wire means to said central station and an audio signal in said wire means is not reproduced by said transducer means and in the second position of said switch means an identification signal is not transmitted from said signal generating means to said central station and an audio signal in said wire means is reproduced by said transducer means; and indicating means at said central station connected to said wire means for indicating the position of the switch at each subscriber station, said indicating means comprising line selecting means connected to said wire means for selectively connecting each of said wire means to a plurality of output lines, signal detecting means connected to each of the output lines of said line selecting means, each of said signal detecting means responding to an identification signal having a frequency different from the frequencies of the other identification signals, recording means connected to each of said signal detecting means for recording non-responsiveness of said signal detecting means, each of said recording means comprising a record medium and means for imparting to said record medium a predetermined record upon the non-responsiveness of the corresponding signal detecting means and actuating means responsive to non-responsiveness of signal detecting means connected between each of said signal detecting means and each corresponding recording means for actuating said recording means upon non-responsiveness of the corresponding signal detecting means thereby indicating that the associated transducer means is connected to said wire means.

8. A pay TV system for determining the operation condition of each of a plurality of subscriber stations comprising, in combination, a central station;

a plurality of subscriber stations;

wire means extending from said central station to each of said subscriber stations;

audio means for transmitting an audio signal to said subscriber stations via said wire means;

signal generating means connected to said wire means at each subscriber station producing an identification signal of a predetermined frequency different from the frequencies of the signal generating means at the other subscriber stations, each said signal generating means comprising a transistor oscillator circuit arrangement;

transducer means at each subscriber station for reproducing an audio signal;

switch means at each subscriber station movable between a first position in which said switch means makes the signal generating means at said subscriber station operative and opens a circuit from said wire means to the transducer means at said subscriber station and a second position in which said switch means makes said signal generating means inoperative and closes a circuit from said wire means to said transducer means so that in the first position of said switch means an identification signal is transmitted from said signal generating means via said wire means to said central station and an audio signal in said wire means is not reproduced by said transducer means and in the second position of said switch means an identification signal is not transmitted from said signal generating means to said central station and an audio signal in said wire means is reproduced by said transducer means; and indicating means at said central station connected to said wire means for indicating the position of the switch at each subscriber station, said indicating means comprising line selecting means connected to said wire means for selectively connecting each of said wire means to a plurality of output lines, signal detecting means connected to each of the output lines of said line selecting means, each of said signal detecting means responding to an identification signal having a frequency different from the frequencies of the other identification signals, recording means connected to each of said signal detecting means for recording non-responsiveness of said signal detecting means, each of said recording means comprising a record medium and means for imparting to said record medium a predetermined record upon the non-responsiveness of the corresponding signal detecting means and actuating means responsive to non-responsiveness of signal detecting means connected between each of said signal detecting means and each corresponding recording means for actuating said recording means upon non-responsiveness of the corresponding signal detecting means thereby indicating that the associated transducer means is connected to said wire means.

9. A pay TV system for determining the operation condition of each of a plurality of subscriber stations comprising, in combination, a central station;

a plurality of subscriber stations;

wire means extending from said central station to each of said subscriber stations;

audio means for transmitting an audio signal to said subscriber stations via said wire means;

signal generating means connected to said wire means at each subscriber station producing an identification signal of a predetermined frequency different from the frequencies of the signal generating means at the other subscriber stations, each said signal generating means comprising a transistor oscillator circuit arrangement;

transducer means at each subscriber station for reproducing an audio signal;

switch means at each subscriber station movable between a first position in which said switch means makes the signal generating means at said subscriber station operative and opens a circuit from said wire means to the transducer means at said subscriber station and a second position in which said switch means makes said signal generating means inoperative and closes a circuit from said wire means to said transducer means so that in the first position of said switch means an identification signal is transmitted from said signal generating means via said wire means to said central station and an audio signal in said wire means is not reproduced by said transducer means and in the second position of said switch means an identification signal is not transmitted from said signal generating means to said central station and an audio signal in said wire means is reproduced by said transducer means; and indicating means at said central station connected to said wire means for indicating the position of the switch at each subscriber station, said indicating means comprising line selecting means connected to said wire means for selectively connecting each of said wire means to a plurality of output lines, signal detecting means connected to each of the output lines of said line selecting means, each of said signal detecting means comprising a transistor circuit arrangement responding to an identification signal having a frequency different from the frequencies of the other identification signals, recording means connected to each of said signal detecting means for recording non-responsiveness of said signal detecting means, each of said recording means comprising a record medium and means for imparting to said record medium a predetermined record upon the non-responsiveness of the corresponding signal detecting means and actuating means responsive to non-responsiveness of signal detecting means connected between each of said signal detecting means and each corresponding recording means for actuating said recording means upon non-responsiveness of the corresponding signal detecting means thereby indicating that the associated transducer means is connected to said wire means.

10. A pay TV system for determining the operation condition of each of a plurality of subscriber stations comprising, in combination, a central station;

a plurality of subscriber stations;

wire means extending from said central station to each of said subscriber stations;

audio means for transmitting an audio signal to said subscriber stations via said wire means;

signal generating means connected to said wire means at each subscriber station producing an identification signal of a predetermined frequency different from the frequencies of the signal generating means at the other subscriber stations;

transducer means at each subscriber station for reproducing an audio signal;

switch means at each subscriber station movable between a first position in which said switch means makes the signal generating means at said subscriber station operative and opens a circuit from said wire means to the transducer means at said subscriber station and a second position in which said switch means makes said signal generating means inoperative and closes a circuit from said wire means to said transducer means so that in the first position of said switch means an identification signal is transmitted from said signal generating means via said wire means to said central station and a audio signal in said wire means is not reproduced by said transducer means and in the second position of said switch means an identification signal is not transmitted from said signal generating means to said central station and an audio signal in said wire means is reproduced by said transducer means; and indicating means at said central station connected to said wire means for indicating the position of the switch at each subscriber station, said indicating means comprising line selecting means connected to said wire means for selectively connecting each of said wire means to a plurality of output lines, signal detecting means connected to each of the output lines of said line selecting means, each of said signal detecting means responding to an identification signal having a frequency different from the frequencies of the other identification signals and recording means connected to each of said signal detecting means for recording non-responsiveness of said signal detecting means, each of said recording means comprising a tape and tape perforating means for imparting to said tape a predetermined combination of code perforations upon the non-responsiveness of the corresponding signal detecting means thereby indicating that the associated transducer means is connected to said wire means.

References Cited by the Examiner

UNITED STATES PATENTS

| | | | |
|---|---|---|---|
| 2,495,769 | 1/1950 | Reeves | 179—7 |
| 2,966,553 | 12/1960 | Wadsworth | 179—17.1 |
| 3,036,159 | 5/1962 | Collins | 179—17.1 |
| 3,070,798 | 12/1962 | Currey et al. | 179—2 |
| 3,093,795 | 6/1963 | Jones | 179—2 |

KATHLEEN H. CLAFFY, *Primary Examiner.*

H. W. ZELLER, *Assistant Examiner.*